(No Model.) 2 Sheets—Sheet 1.

J. NUSBECK.
HOSE COUPLING.

No. 328,427. Patented Oct. 13, 1885.

Witnesses.
Irving A. Welton
C. Bendixon

Inventor.
John Nusbeck
per Duell, Lassot Hey
Atty (No Model.) 2 Sheets—Sheet 2.
J. NUSBECK.
HOSE COUPLING.
No. 328,427. Patented Oct. 13, 1885.
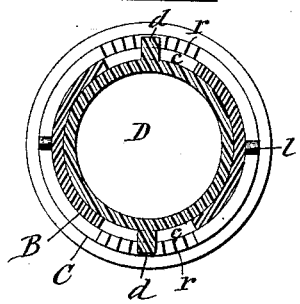
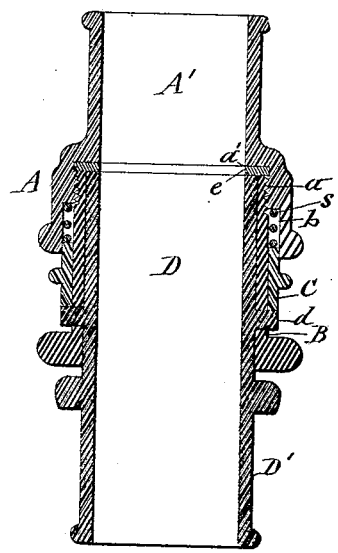
Witnesses
Irving A. Weston
C. Bendixon
Inventor
John Nusbeck
per Duell, Laass & Hey
attys

UNITED STATES PATENT OFFICE.

JOHN NUSBECK, OF ROME, NEW YORK, ASSIGNOR TO BURT OLNEY, OF SAME PLACE.

HOSE-COUPLING.

SPECIFICATION forming part of Letters Patent No. 328,427, dated October 13, 1885.

Application filed August 20, 1885. Serial No. 174,853. (No model.)

*To all whom it may concern:*

Be it known that I, JOHN NUSBECK, of Rome, in the county of Oneida, in the State of New York, have invented new and useful Improvements in Hose-Couplings, of which the following, taken in connection with the accompanying drawings, is a full, clear, and exact description.

This invention consists in a novel construction and combination of the component parts of a pipe or hose coupling, by means of which the coupling can be effected in a most convenient, quick, and secure manner, all as hereinafter more fully described, and specifically pointed out in the claims.

Figure 1:
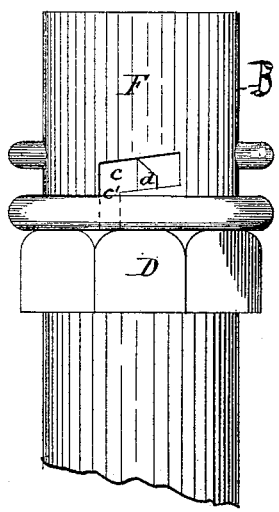
Figure 2:
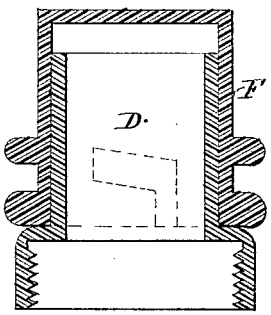
Figure 3:
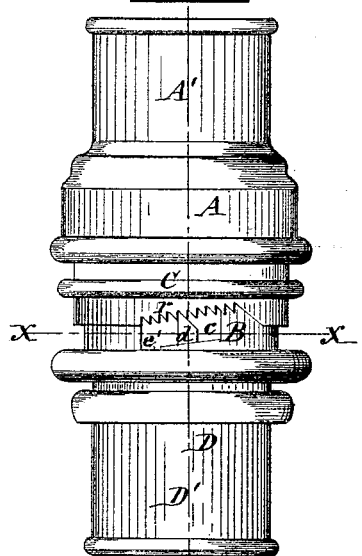
Figure 4:
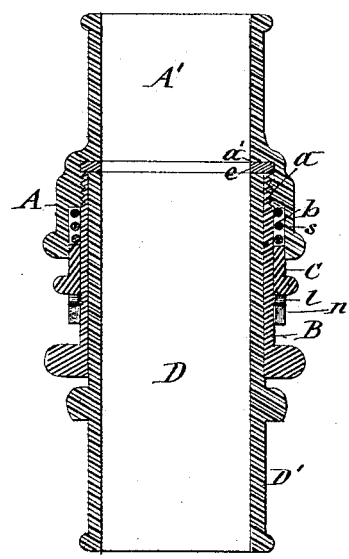

In the annexed drawings, Figures 1 and 2 are respectively a side view and a longitudinal section of the cap, which is designed to be applied to the hydrant after my improved hose-coupling is detached therefrom. Said views are given merely for the purpose of showing to the user of my invention a suitable device for closing the mouth of the hydrant, but which device I do not claim as part of my invention. Fig. 3 is a side view of the pipe or hose coupling complete. Figs. 4 and 5 are longitudinal sections of said coupling, taken in planes at right angles to each other, and Fig. 6 is a transverse section on line $x\ x$, Fig. 3.

Similar letters of reference indicate corresponding parts.

A denotes a gland formed on the end of a collar or sleeve, A', which is connected to the end of a pipe or hose in any usual and well-known manner. Said gland is formed internally with a screw-threaded annular recess, $a$, and a circumferentially-enlarged secondary annular recess, $b$, extending from the outer end of the recess $a$ to the free end of the gland. The recess $a$ is of a diameter to receive in it the sleeve or female section B of the coupling, and bring flush with the interior of the collar A' the interior of the male section D of the coupling, which latter enters the female section B. The inner end of the recess $a$ terminates with an abrupt offset, forming a shoulder, $a'$, upon which is placed a gasket or packing-ring, $e$, against which press the inner ends of the parts B and D, aforesaid, and thus render the connection of the same with the gland A water-tight.

The female section B is provided with inclined cam-slots $c\ c$, terminating with entering slots $c'\ c'$, which extend through the outer end of the part B.

The male section D has on opposite sides lugs $d\ d$, which project through the slots $c\ c$, and have their outer ends beveled in the form of a pawl.

In the recess $b$ of the gland A is seated a spring, $s$, and against this spring rests the locking-ring C, which loosely embraces the sleeve or female section B, so as to allow it to slide endwise thereon. A lug, $l$, projecting from the side of the section B, and through a longitudinal slot, $n$, in the ring C, prevents the latter from turning. The outer end of said ring is formed with ratchets $r\ r$, which are arranged in planes parallel to the inclinations of the slots $c\ c$.

The male section D may be either provided with an extension, D', by which to attach it to the end of a pipe or hose in the usual and well-known manner, or formed with a female threaded collar by which to attach it to the hydrant of a water-main.

The operation of my invention is as follows: In coupling the hose or pipe the male section D is introduced into the sleeve or female section B in such a manner as to carry the lugs $d\ d$ through the slots $c'\ c'$. Then by turning the male section D so as to move the lugs $d\ d$ into the cam-grooves $c\ c$, the inclination of the latter crowds the lugs $d\ d$ toward the gland A, and thereby forces the male section D in the same direction, and causes the inner end thereof to bear on the packing-ring $e$. In this operation the ends of the lugs $d\ d$ traverse the ratchets $r\ r$, which are pressed toward the lugs by the spring $s$ bearing on the inner end of the locking-ring C. The engagement of said ratchets with the aforesaid lug prevents the return movement of the male section D, and thus securely maintains the coupling intact.

To uncouple the hose or pipe the locking-ring has to be pushed back toward the gland A to release the lugs $d\ d$. Then by turning back the male section D the lugs are brought to the slot-extensions $c'\ c'$, which allow the male section D to be withdrawn from the female section B.

F represents a cap designed to be applied to a hydrant after the before-described coupling is removed, said cap being provided with the cam-slots $c\ c$ and entrance slots $c'\ c'$ to receive the lugs $d\ d$ of the male section D, which is permanently secured to the hydrant. The engagement of said lugs with the cam-grooves serves to secure the cap in position.

Having described my invention, what I claim as new is—

1. The combination of the gland A, formed internally with the screw-threaded circular recess $a$, and circumferentially-enlarged secondary recess $b$ at the outer end of the recess $a$, the female section B screwed into the recess $a$ and provided with the cam-slots $c\ c$, terminating with the longitudinal entering slots $c'\ c'$, the locking-ring C, arranged movably endwise on the exterior of the female section and restrained from turning thereon, and provided with the ratchet $r$, the spring $s$, seated in the recess $b$, the male section D, entering the interior of the section B, and the lugs $d\ d$, projecting from the male section through the slots $c\ c$ and engaging the ratchet $r$, substantially as described and shown.

2. In combination with the male section D, provided with the lugs $d\ d$, and the female section B, provided with cam-slots $c\ c$, and with external screw-threads on its end, the gland A, formed with the screw-threaded annular recess $a$, having the shoulder $a'$ projecting across the ends of the sections D and B, the packing $e$ on said shoulder, the secondary recess $b$ at the outer end of the recess $a$, the locking-ring C on the exterior of the section B, and provided with the ratchet $r$, and the spring $s$, seated in the recess $b$, substantially as described and shown.

In testimony whereof I have hereunto signed my name and affixed my seal, in the presence of two attesting witnesses, at the city of Rome, in the county of Oneida, in the State of New York, this 14th day of August, 1885.

JOHN NUSBECK. [L. S.]

Witnesses:
 JOHN S. BAKER,
 A. DELOS KNEELAND.